United States Patent
Mitchell et al.

(10) Patent No.: US 6,539,742 B2
(45) Date of Patent: Apr. 1, 2003

(54) ICE MAKER WITH MAGNETIC WATER CONDITIONER

(75) Inventors: Alan J. Mitchell, Evansville, IN (US); Herbert P. Sabelhaus, Evansville, IN (US); John P Tinney, Evansville, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 10/065,310

(22) Filed: Oct. 2, 2002

(65) Prior Publication Data

US 2003/0024263 A1 Feb. 6, 2003

(51) Int. Cl.[7] .................................................. F25C 1/00
(52) U.S. Cl. .............................. 62/340; 62/78; 210/223
(58) Field of Search ................................. 210/222, 223, 210/695; 62/66, 78, 340

(56) References Cited

U.S. PATENT DOCUMENTS

| | | | |
|---|---|---|---|
| 4,009,595 A | 3/1977 | Barnard et al. | 62/300 |
| 4,357,237 A * | 11/1982 | Sanderson | 210/222 |
| 4,417,894 A | 11/1983 | Norris | 604/385 |
| 4,428,837 A | 1/1984 | Kronenberg | 210/222 |
| 4,876,860 A | 10/1989 | Negishi | 62/179 |
| 4,957,626 A * | 9/1990 | Ashbrook et al. | 210/695 |
| 5,037,547 A | 8/1991 | Burrows | 210/232 |
| 5,453,188 A | 9/1995 | Florescu et al. | 210/222 |

* cited by examiner

Primary Examiner—William E. Tapolcai
(74) Attorney, Agent, or Firm—Robert O. Rice; Stephen Krefman; John F. Colligan

(57) ABSTRACT

An ice maker is provided including a refrigeration system for cooling an ice forming surface below the freezing temperature of water. The ice maker further includes a water supply inlet, a water collecting device connected to receive a supply of water from the water supply inlet and arranged to receive a flow of water from the ice forming surface, a recirculating pump having an inlet connected to the water collecting device, a recirculating passage connected at a first end to an outlet of the recirculating pump and arranged to direct water toward the ice making surface, and a magnetic field generating device positioned along a length of the recirculating passage.

20 Claims, 3 Drawing Sheets

ICE MAKER WITH MAGNETIC WATER CONDITIONER

BACKGROUND OF INVENTION

The present invention relates generally to ice makers.

Ice makers, particularly those used in homes and small businesses are well known and employ a refrigeration system to chill an ice forming surface below the freezing temperature of water. Such refrigeration systems typically include a compressor, an evaporator and a condenser all connected by refrigerant lines. The ice forming surface is thermally connected to the evaporator and is chilled to a temperature below the freezing temperature of water, then a supply of water is dispensed onto this surface and allowed to freeze. In some systems, the water is dispensed onto the surface and all of the dispensed water is held there until it has frozen into ice. In other systems, the water flows over the chilled surface and some turns to ice and the remainder is collected and recirculated. Such a system is disclosed in U.S. Pat. No. 4,009,595 which was assigned to the assignee hereof, and which is incorporated herein by reference.

A problem that develops with ice makers is that minerals in the water, and particularly calcium, form deposits on the ice forming surface, decreasing the thermal transfer effectiveness of the ice forming surface, thereby decreasing the effectiveness and energy efficiency of the ice maker. This requires the ice forming surface to be cleaned on a regular basis to remove these deposits.

It is known, in various types of water supply systems, to use a magnetic device in association with a water feed line, to reduce scale deposits.

SUMMARY OF INVENTION

The invention provides a system in an ice maker of the recirculating type for reducing the scale forming minerals by utilizing a magnetic device in association with the recirculating passage for the water. Unlike other systems where the magnetic device is used in association with the water inlet line, use of the magnetic device in association with the recirculating passage allows for multiple treatment occurrences on any given volume of water, thereby increasing the effectiveness of the treatment.

In an embodiment of the invention, an ice maker is provided comprising a refrigeration system for cooling an ice forming surface below the freezing temperature of water. The ice maker further includes a water supply inlet, a water collecting device connected to receive a supply of water from the water supply inlet and arranged to receive a flow of water from the ice forming surface, a recirculating pump having an inlet connected to the water collecting device, a recirculating passage connected at a first end to an outlet of the recirculating pump and arranged to direct water toward the ice making surface, and a magnetic field generating device positioned along a length of the recirculating passage.

In an embodiment of the invention, an ice maker is provided comprising a cabinet, a compressor, a condenser and an evaporator in the cabinet, along with a series of refrigerant lines connecting the compressor to the evaporator, the evaporator to the condenser and the condenser to the compressor. An evaporator plate is thermally connected to the evaporator. A water supply line is connected to deliver water to a water reservoir and the water reservoir is arranged to receive a flow of water from the evaporator plate. A water distributor is positioned to deliver a supply of water to the evaporator plate. A recirculating pump has an inlet connected to the water reservoir and an outlet connected to a recirculating tube. The recirculating tube is connected to the water distributor. A magnetic field generating device is positioned along a length of the recirculating tube.

In an embodiment of the invention, an ice maker is provided comprising a cabinet, a compressor, a condenser and an evaporator in the cabinet. A series of refrigerant lines connect the compressor to the evaporator, the evaporator to the condenser and the condenser to the compressor. The evaporator has an ice forming surface thermally associated therewith. A water supply line is connected to deliver water to a water collecting device and the water collecting device is also arranged to receive a flow of water from the ice forming surface. A recirculating pump has an inlet connected to the water collecting device and a recirculating tube is connected at a first end to an outlet of the recirculating pump and is arranged to distribute water at a second end to the ice making surface. A magnetic field generating device is positioned along a length of the recirculating tube.

These and other objects, features, and advantages of the present invention will become apparent upon a reading of the detailed description and a review of the accompanying drawings. Specific embodiments of the present invention are described herein. The present invention is not intended to be limited to only these embodiments. Changes and modifications can be made to the described embodiments and yet fall within the scope of the present invention.

DETAILED DESCRIPTION

Figure 1:
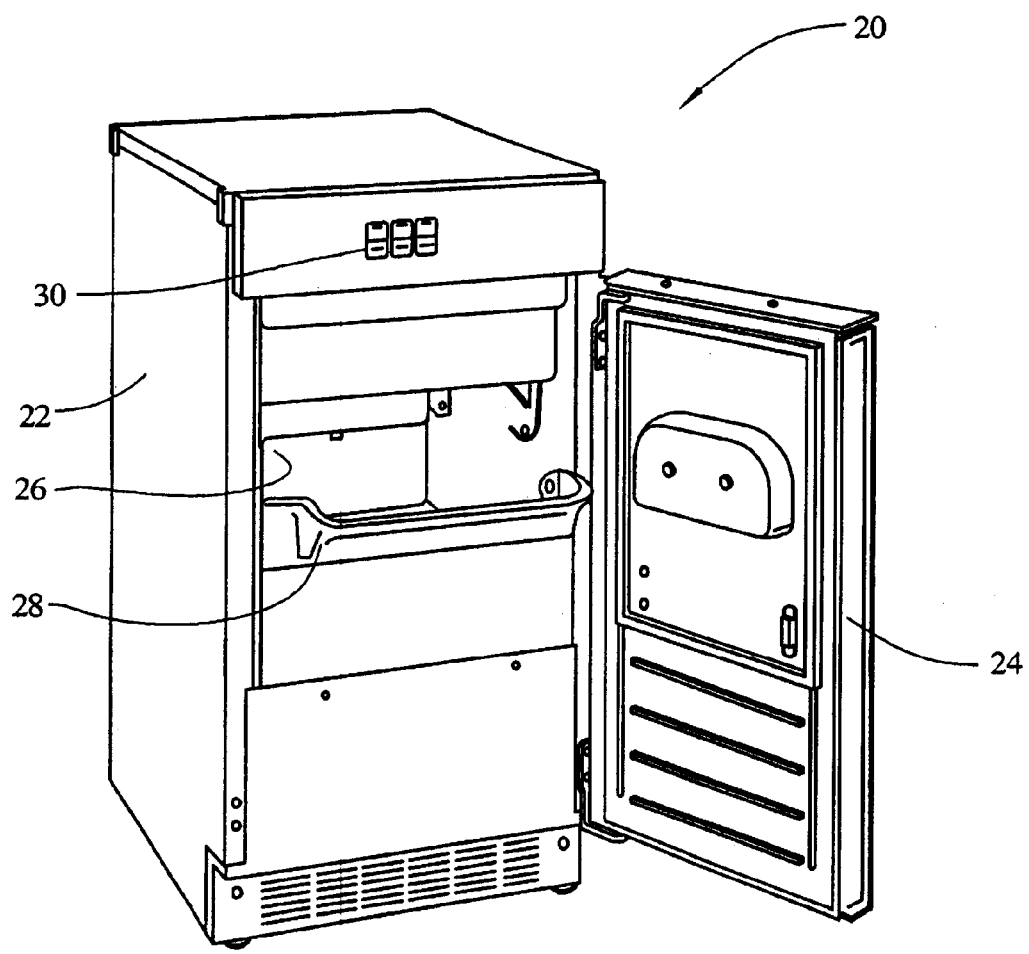
FIG. 1 is a perspective view of an ice maker embodying the principles of the present invention.

FIG. 1 is a perspective view of an ice maker 20 in which an embodiment of the invention may be practiced. This ice maker has a cabinet 22 for housing various components of the ice maker, and also includes a door 24 providing access to an interior 26 of the ice maker, particularly for retrieving ice stored in an ice storage bin 28. A plurality of controls 30 are provided on the exterior of the cabinet 22 for controlling the operation of the ice maker.

Figure 2:
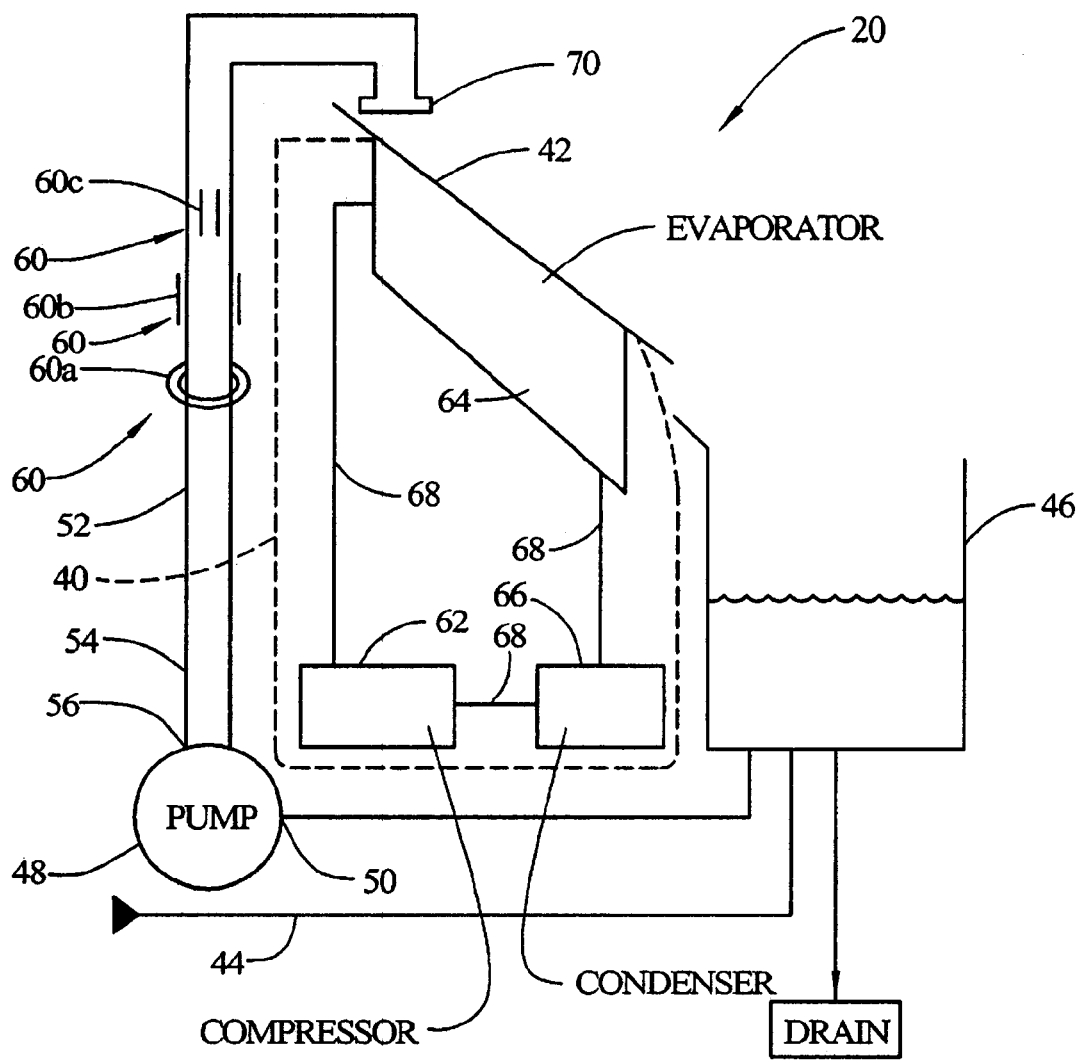
FIG. 2 is a schematic view of an ice maker embodying the principles of the present invention.

The components of an ice maker 20 embodying the principles of the present invention are illustrated schematically in FIG. 2. In this embodiment, the ice maker 20 comprises a refrigeration system 40 for cooling an ice forming surface 42 below the freezing temperature of water and a water supply inlet 44. A water collecting device 46 is connected to receive a supply of water from the water supply inlet 44 and is arranged to receive a flow of water from the ice forming surface 42. A recirculating pump 48 has an inlet 50 connected to the water collecting device 46. A recirculating passage 52 is connected at a first end 54 to an outlet 56 of the recirculating pump 48 and is arranged to direct water toward the ice forming surface 42. A magnetic field generating device 60 is positioned along a length of the recirculating passage 52. In an embodiment, the refrigeration system 40 may comprise a compressor 62, an evaporator 64, and a condenser 66 connected by refrigerant lines 68. Other known types of refrigerant systems may also be utilized to chill the ice forming surface 42 below the freezing temperature of water.

The water supply inlet 44 may be connected directly to the water collecting device 46 and the water collecting device may comprise a water reservoir. The recirculating passage 52 may comprises a tube connected between the pump 48 and the ice forming surface 42. A water distributor 70 may be positioned between the recirculating passage 52 and the ice forming surface 42.

The magnetic field generating device 60 may comprise one or more permanent magnets or one or more electromagnets. These devices 60 may be positioned at various locations along the recirculating passage 52 and may completely surround the passage (as at 60a) or may be merely positioned along side the passage (as at 60b). Preferably, the device 60 is located wholly exterior of the passage 52, but in some embodiments, may be positioned on the interior of the passage.

Figure 3:
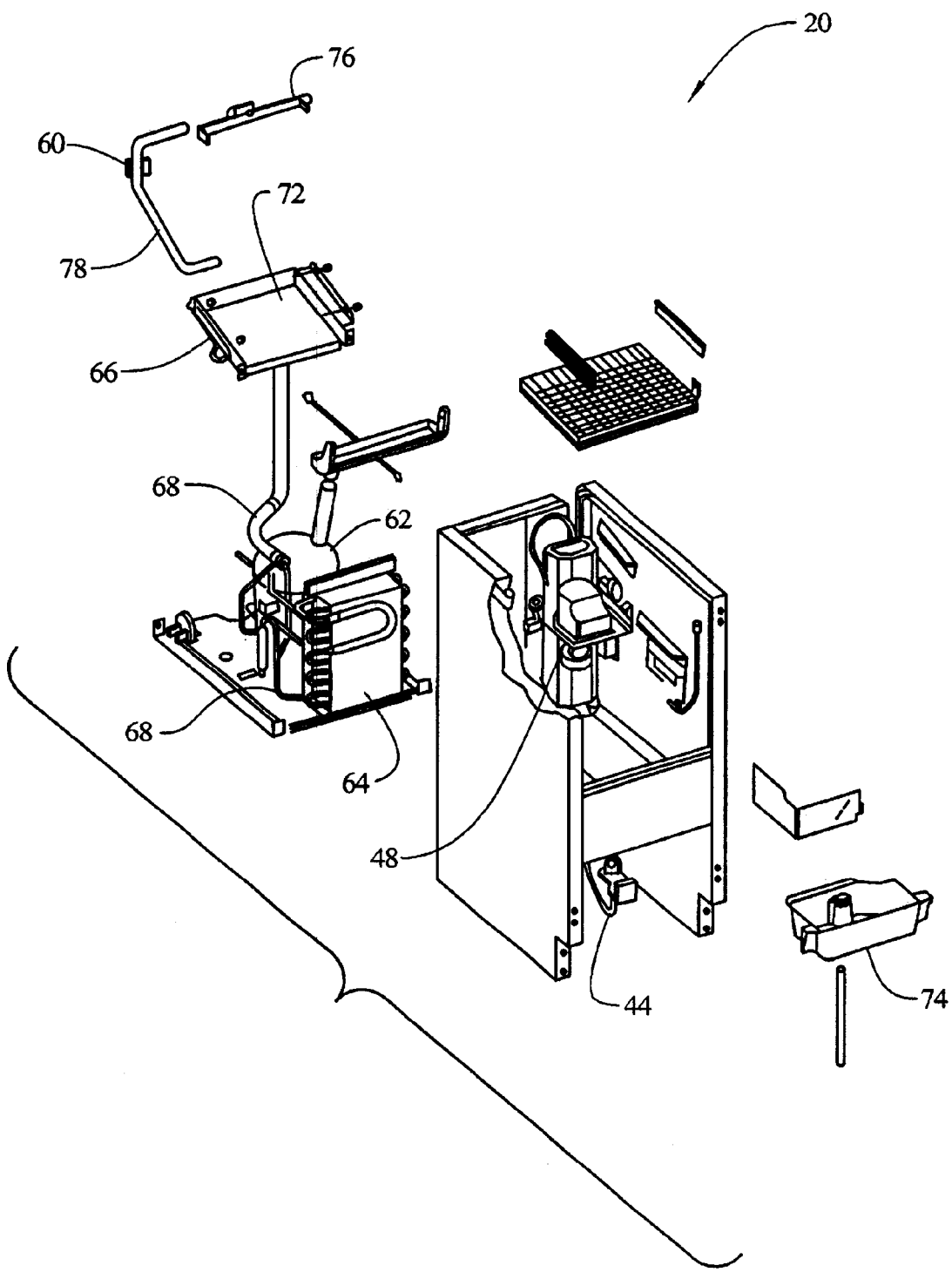
FIG. 3 is an exploded view of the interior components of the ice maker of FIG. 1.

A more detailed illustration of various interior components of a particular embodiment of the ice maker 20 embodying the principles of the present invention are shown in FIG. 3, including a refrigeration system which may include the compressor 62, the condenser 64, the evaporator 66 and the series of refrigerant lines 68 connecting the compressor to the evaporator, the evaporator to the condenser and the condenser to the compressor. An evaporator plate 72 is thermally connected to the evaporator 66 and forms an ice forming surface.

The water supply inlet line 44 is connected to deliver water to a water reservoir 74 and the water reservoir is arranged to receive a flow of water from the evaporator plate 72. A water distributor 76 is positioned to deliver a supply of water to the evaporator plate 72. The recirculating pump 48 has an inlet connected to the water reservoir 74 and an outlet connected to a recirculating tube 78. The recirculating tube 78 is connected to the water distributor 76. The magnetic field generating device 60 (which can be any of the types described above, and placed as previously described) is positioned along a length of the recirculating tube 78.

Other components of the ice maker, which are known to those of skill in the art, but which do not pertain to the present invention are illustrated, but not described.

The present invention has been described utilizing particular embodiments. As will be evident to those skilled in the art, changes and modifications may be made to the disclosed embodiments and yet fall within the scope of the present invention. The disclosed embodiments are provided only to illustrate aspects of the present invention and not in any way to limit the scope and coverage of the invention. The scope of the invention is therefore to be limited only by the appended claims.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

What is claimed is:

1. An ice maker comprising:
   a cabinet,
   a compressor in said cabinet,
   a condenser in said cabinet,
   an evaporator in said cabinet,
   a series of refrigerant lines connecting said compressor to said evaporator, said evaporator to said condenser and said condenser to said compressor,
   an evaporator plate thermally connected to said evaporator,
   a water supply line,
   a water distributor positioned to deliver a supply of water to said evaporator plate,
   a water reservoir connected to receive a supply of water from said water supply line and arranged to receive a flow of water from said evaporator plate,
   a recirculating pump having an inlet connected to said water reservoir,
   a recirculating tube connected to an outlet of said recirculating pump and to said water distributor, and
   a magnetic field generating device positioned along a length of said recirculating tube.

2. An ice maker according to claim 1, wherein said magnetic field generating device comprises at least one permanent magnet.

3. An ice maker according to claim 1, wherein said magnetic field generating device comprises at least one electromagnet.

4. An ice maker comprising:
   a cabinet,
   a compressor in said cabinet,
   a condenser in said cabinet,
   an evaporator in said cabinet,
   a series of refrigerant lines connecting said compressor to said evaporator, said evaporator to said condenser and said condenser to said compressor, said evaporator having an ice forming surface thermally associated therewith,
   a water supply line,
   a water collecting device connected to receive a supply of water from said water supply line and arranged to receive a flow of water from said ice forming surface,
   a recirculating pump having an inlet connected to said water collecting device,
   a recirculating tube connected at a first end to an outlet of said recirculating pump and arranged to distribute water at a second end to said ice forming surface, and
   a magnetic field generating device positioned along a length of said recirculating tube.

5. An ice maker according to claim 4, wherein said ice forming surface comprises a plate in contact with said evaporator.

6. An ice maker according to claim 4, wherein said water collecting device comprises a reservoir.

7. An ice maker according to claim 4, including a water distributor provided between said recirculating tube and said ice forming surface.

8. An ice maker according to claim 4, wherein said magnetic field generating device comprises at least one permanent magnet.

9. An ice maker according to claim 4, wherein said magnetic field generating device comprises at least one electromagnet.

10. An ice maker comprising:
    a refrigeration system for cooling an ice forming surface below the freezing temperature of water,
    a water supply inlet, a water collecting device connected to receive a supply of water from said water supply inlet and arranged to receive a flow of water from said ice forming surface, a recirculating pump having an inlet connected to said water collecting device, a recirculating passage connected at a first end to an outlet of said recirculating pump and arranged to direct water toward said ice making surface, and a magnetic field generating device positioned along a length of said recirculating passage.

11. An ice maker according to claim 10, wherein said refrigeration system comprises a compressor, an evaporator, and a condenser connected by refrigerant lines.

12. An ice maker according to claim 10, wherein said water supply inlet is connected directly to said water collecting device.

13. An ice maker according to claim 10, wherein said water collecting device comprises a water reservoir.

14. An ice maker according to claim 10, wherein said recirculating passage comprises a tube connected between said pump and said ice forming surface.

15. An ice maker according to claim 10, including a water distributor positioned between said recirculating passage and said ice forming surface.

16. An ice maker according to claim 10, wherein said magnetic field generating device comprises at least one permanent magnet.

17. An ice maker according to claim 10, wherein said magnetic field generating device comprises at least one electromagnet.

18. An ice maker according to claim 10, wherein said magnetic field generating device comprises a positioned inside said magnet.

19. An ice maker according to claim 10, wherein said magnetic field generating device comprises a magnet positioned along side an exterior of said passage.

20. An ice maker according to claim 19, wherein said magnetic field generating device comprises a magnet surrounding said passage.

* * * * *